(12) United States Patent
Camps

(10) Patent No.: US 9,012,007 B2
(45) Date of Patent: Apr. 21, 2015

(54) METHOD FOR SHAPING A MATERIAL WITH A RETICULAR STRUCTURE, PLANT FOR PERFORMING SAME AND RETICULAR MATERIAL RESULTING FROM THE METHOD

(71) Applicant: Intermas Nets S.A., Llinars del Valles (ES)

(72) Inventor: Luis Besas Camps, Cardedeu (ES)

(73) Assignee: Intermas Nets S.A., Llinars del Valles (ES)

(*) Notice: Subject to any disclaimer, the term of this patent is extended or adjusted under 35 U.S.C. 154(b) by 106 days.

(21) Appl. No.: 13/645,821

(22) Filed: Oct. 5, 2012

(65) Prior Publication Data

US 2013/0029072 A1  Jan. 31, 2013

Related U.S. Application Data

(60) Division of application No. 12/212,689, filed on Sep. 18, 2008, now Pat. No. 8,282,865, which is a continuation-in-part of application No. PCT/ES2007/000189, filed on Apr. 3, 2007.

(30) Foreign Application Priority Data

Apr. 10, 2006  (ES) .................................. 200601012

(51) Int. Cl.
 B32B 3/24    (2006.01)
 B29C 55/26   (2006.01)
 B29C 47/00   (2006.01)
 B29C 47/12   (2006.01)
 B29C 55/14   (2006.01)
 B29D 28/00   (2006.01)
(Continued)

(52) U.S. Cl.
CPC ........... B29C 55/26 (2013.01); *Y10T 428/1345* (2015.01); *Y10T 156/1005* (2015.01);
(Continued)

(58) Field of Classification Search
CPC .... B29C 55/26; B29C 55/14; B29C 47/0033; B29C 47/12; B65D 29/04; B29D 28/00; Y10T 428/1362; Y10T 428/1345; Y10T 428/1334
USPC ........................................................ 428/131
See application file for complete search history.

(56) References Cited

U.S. PATENT DOCUMENTS 2,002,711 A    5/1935 Parkhurst et al.
2,919,467 A *  1/1960 Mercer .......................... 264/167
(Continued)

FOREIGN PATENT DOCUMENTS

EP    0 067 238    12/1982
EP    0 788 974     8/1997
(Continued)

OTHER PUBLICATIONS

Extended European Search Report for European Patent Application No. 07 730 429.3, dated Dec. 22, 2011.

*Primary Examiner* — William P Watkins, III
(74) *Attorney, Agent, or Firm* — Alston & Bird LLP

(57) ABSTRACT

A reticular tubular structure formed by extruded filaments of synthetic plastic material extending in two oppositely tilted directions with respect to an axial direction of the tubular reticular structure. The filaments cross one another to form a tubular net of interconnected rhomboid meshes, vertices of the rhomboid meshes being formed by crossover points between two filaments fused together, while sides of the rhomboid meshes are formed by said filaments outside the crossover points. The tubular reticular structure is molecularly oriented in both longitudinal and transverse directions thereof, and is calendered so that the crossover points, at the vertices of the rhomboid meshes, and the filaments, at the sides thereof, have the same common thickness.

3 Claims, 10 Drawing Sheets

(51) Int. Cl.
    *B65D 30/06*     (2006.01)
    *B29C 47/24*     (2006.01)
    *B29C 47/34*     (2006.01)
    *B29K 105/10*     (2006.01)
    *B29L 28/00*     (2006.01)

(52) U.S. Cl.
    CPC ...... Y10T428/1362 (2015.01); Y10T 428/1334 (2015.01); *B29C 47/0033* (2013.01); *B29C 47/12* (2013.01); B29C 47/24 (2013.01); B29C 47/34 (2013.01); *B29C 55/14* (2013.01); *B29D 28/00* (2013.01); B29K 2105/108 (2013.01); B29L 2028/00 (2013.01); *B65D 29/04* (2013.01)

(56) References Cited

U.S. PATENT DOCUMENTS

| | | | |
|---|---|---|---|
| 3,140,330 A | 7/1964 | Gutierrez | |
| 3,222,440 A | 12/1965 | Murphy | |
| 3,290,420 A | 12/1966 | Orser | |
| 3,305,615 A | 2/1967 | Donald | |
| 3,317,951 A | 5/1967 | Hureau | |
| 3,370,116 A | 2/1968 | Wrede | |
| 3,466,359 A | 9/1969 | van Burleigh et al. | |
| 3,968,621 A | 7/1976 | Poupitch | |
| 4,059,713 A | 11/1977 | Mercer | |
| 4,152,479 A | 5/1979 | Larsen | |
| 4,190,692 A | 2/1980 | Larsen | |

FOREIGN PATENT DOCUMENTS

| | | |
|---|---|---|
| ES | 158340 | 2/1971 |
| ES | 290122 | 4/1986 |
| ES | 290123 | 4/1986 |
| ES | 290124 | 4/1986 |
| ES | 290125 | 4/1986 |
| ES | 290126 | 4/1986 |
| ES | 2 014 712 | 7/1990 |
| ES | 2 023 601 | 1/1992 |
| FR | 1 566 717 | 5/1969 |
| GB | 2 169 841 | 7/1986 |

\* cited by examiner

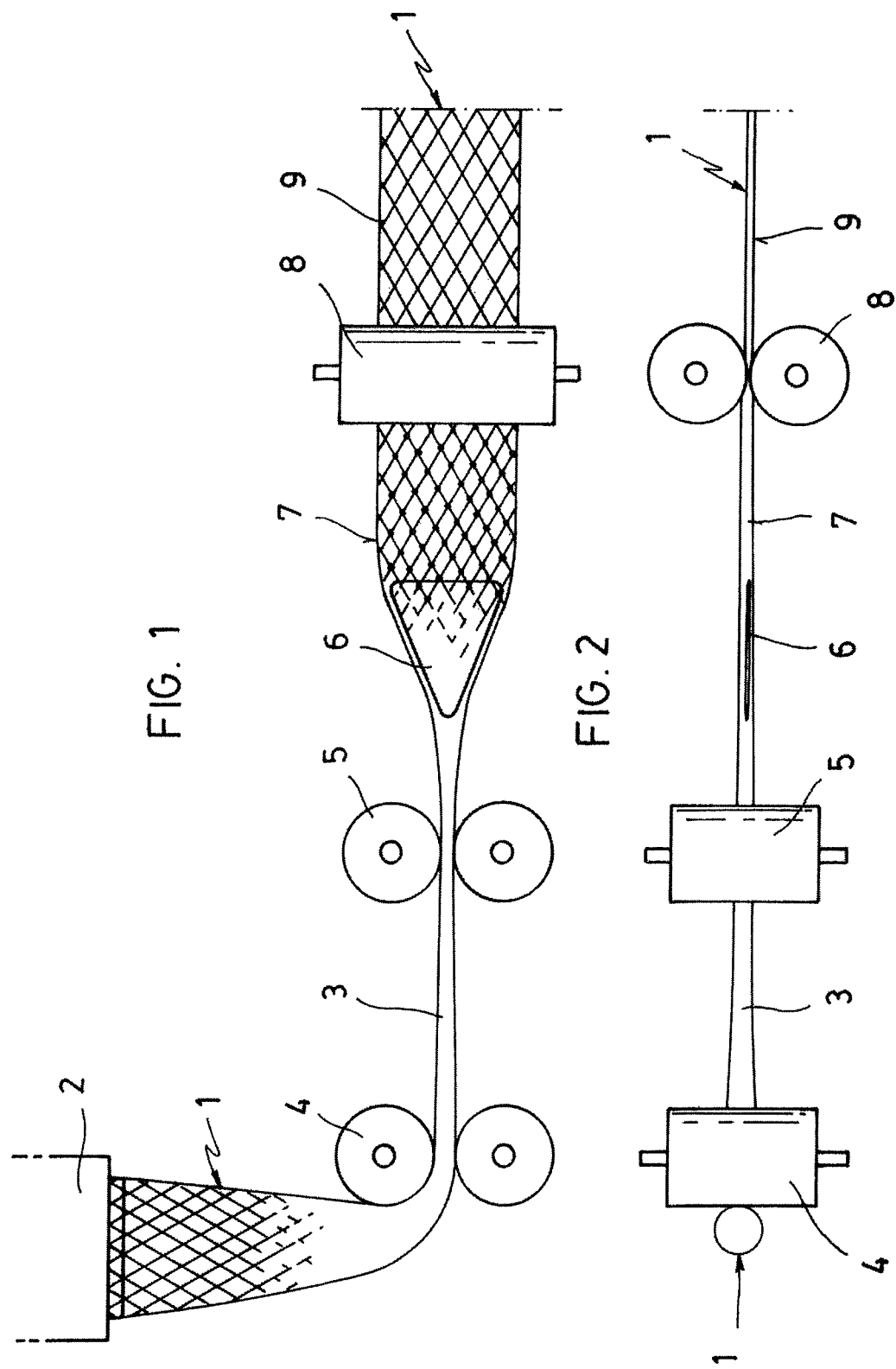

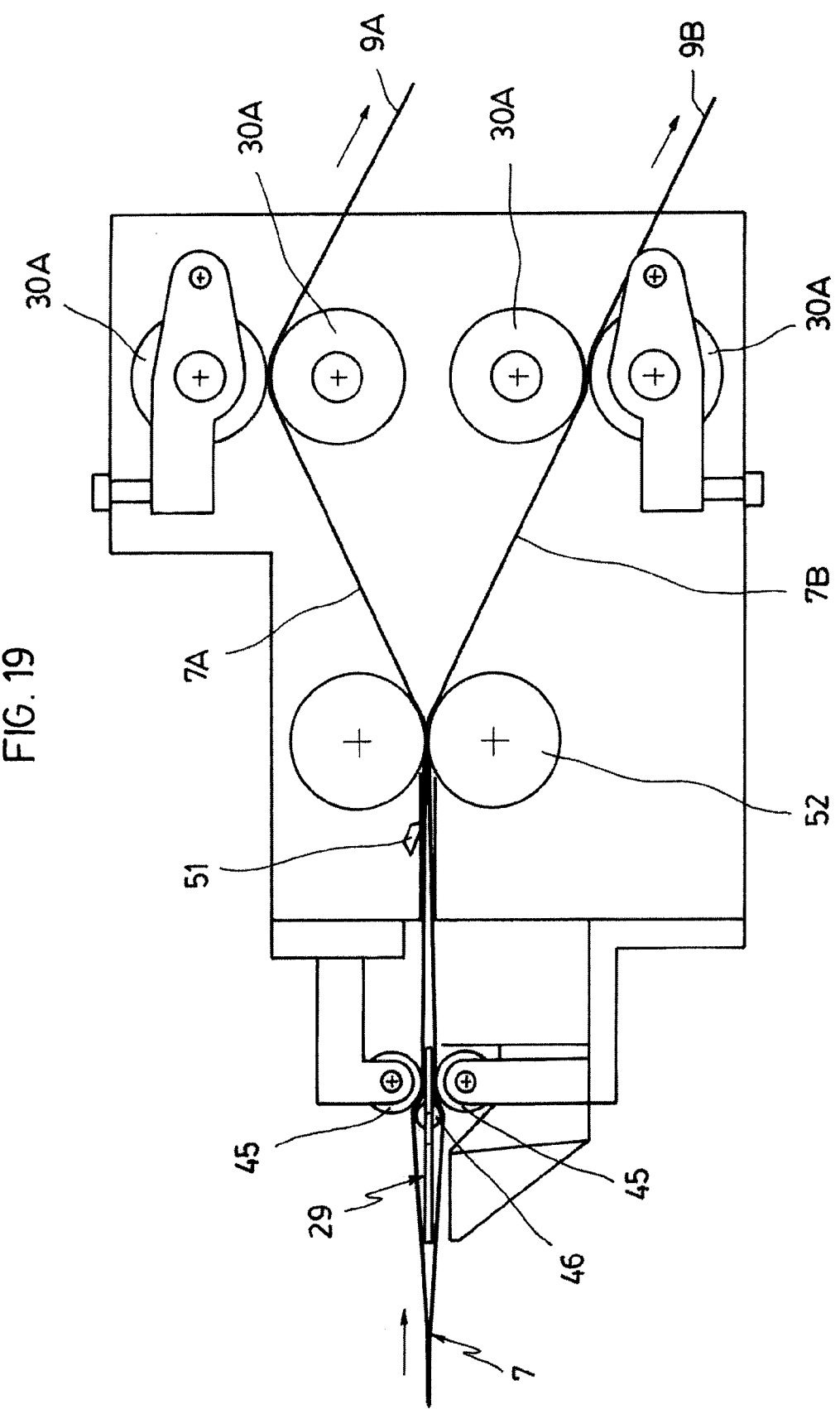

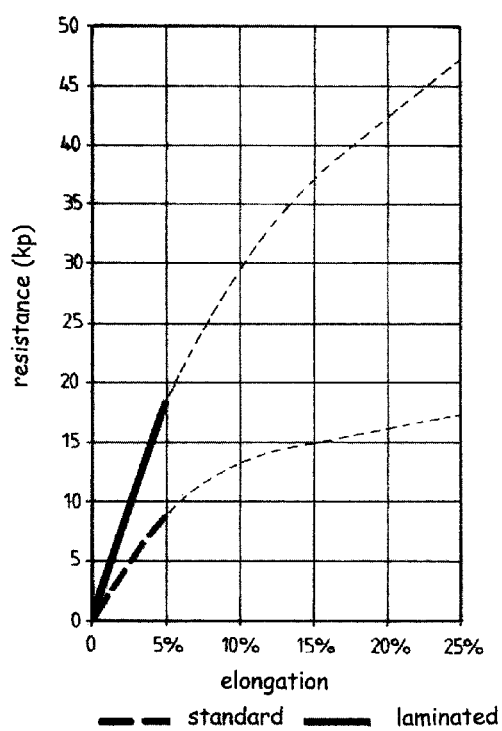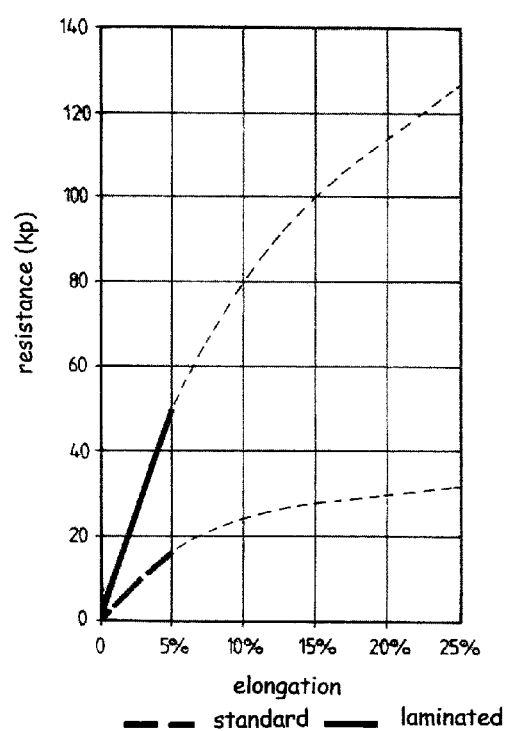

METHOD FOR SHAPING A MATERIAL WITH A RETICULAR STRUCTURE, PLANT FOR PERFORMING SAME AND RETICULAR MATERIAL RESULTING FROM THE METHOD

BACKGROUND OF THE INVENTION

This invention relates to a method for shaping a material with a reticular structure, or a net structure, which also includes a plant for performing same and the reticular material resulting from the method.

The method in question is applied to handling a synthetic plastics material with a reticular structure, in particular one having a tubular shape, which is one of the type with a known constitution and obtained by means of an extrusion process.

The reticular material resulting from the said method is particularly applied to the packaging industry in general, and it is worth mentioning how important its use is in packaging food products and, more specifically, fruit and vegetable products.

For many years the use of net containers has been known, either of the knotted type, such as net bags, or of the type bound by plain knitting, such as the bags of a loosely woven fabric, like hemp canvas, sackcloth, matting, leno, etc. to transport onions, potatoes, etc., on a commercial level, or of the type obtained by extruding a synthetic plastics material, such as the one used to make bags for packaging various products used on a domestic level, such as oranges, potatoes, onions, nuts, chestnuts, lemons, etc.

The Spanish Utility Model No. 158.340 is known, which describes an extruded net that is mono- or biaxially oriented, without this transcending to the cross points, which has low tensile strength, good dimensional stability and reduced coverage ability.

The actual applicant is the owner of Spanish Utility Model Nos. 290.122, 290.123, 290.124, 290.125 and 290.126 that relate to different variants of tubular flattened extruded net arrangements, made up of two or three non-molecularly oriented filaments, having the characteristics of low tensile strength, good dimensional stability and high coverage ability.

Patent EP 0 788 974 is also known, which relates to a packaging made up of non-oriented extruded net which is folded with a plastic film and joined to it by welding, and Patent ES 2.014.712 which describes packaging bags made from woven net with plastic filaments which is folded with a plastic film joined to the woven net by welding.

Moreover other patents are known that are related to this application, and they are:

U.S. Pat. No. 3,140,330 relates to a system for drawing, longitudinally and transversally, a tubular net after it has been extruded controlling its drawing with a calibration ring and a hot bath, with the net being dragged by a winder, not shown, and guided by two lower submerged rollers, which do not come into contact with one another, and a top guide roller. In this patent no operation for laminating the tubular flattened net resulting from the drawing operation, is envisaged.

U.S. Pat. No. 2,002,711, relating to a method for producing a flat, continuous and smooth web of cellulosic material, in other words, it is not a reticular tubular structure, although it envisages using calendering rollers to surface the web of material. Nevertheless, the plant shown in said patent to describe the process for producing the flat, continuous and smooth web is slightly reminiscent of possible, non-claimed variants described in this invention and which correspond to FIGS. 13 and 14 in the description.

U.S. Pat. No. 3,968,621 relates to a method for obtaining a flat device for transporting cans of drink, which is made up of a plurality of cables which, describing irregular trajectories on a plane that determine meetings between pairs of said cables, form a flat grid with openings slightly smaller than the section of the cans to be contained. This narrow web which is flat, and therefore not tubular, and is not molecularly oriented by the corresponding longitudinal drawing and transversal widening operations, is a different starting material to that which is the object of this patent application, and it is not to be understood that this is affected by the fact that in some case said narrow support web for drink cans undergo a calendering operation, which is performed by flattening the cables and intersection points until they are reduced to a perforated lamina that is similar to the equivalent narrow webs obtained through die-cutting or punching the laminar material.

FR patent 1.566.717 relates to a plastic mesh net intended to cover boxes for transporting fruit and vegetables, which is obtained from a plastics material that is shaped by extruding a material with a reticular tubular structure that is subjected to a single longitudinal drawing operation, without being accompanied at any time by a transversal widening operation, after which the material with a reticular tubular structure opens, transformed into a laminar material such as those in FIG. 1 and A of FIG. 5, with the material in the above-mentioned shape being subjected to a calendering operation to give it a flat shape.

U.S. Pat. No. 3,370,116 relates to a method for widening a reticular tubular structure up to a predetermined size, this aim being achieved with a mandrel 12, the projection of a hot fluid in station A and a cooling operation in station B, feeding the material by dragging it on rollers 18 without this in any way suggesting a laminating effect, since said rollers 18 do not form a laminating calendering machine.

Patent EP 0 067 238 relates to a method and apparatus for the continuous biaxial orientation of an extruded web of plastics material that is dragged and surfaced by passing through the two rollers 16A and 16B to obtain the longitudinal drawing thereof, which is followed immediately by a widening operation performed by the widening blades 18, without this at any time producing a laminating operation of the web, which undoubtedly does not have a reticular tubular structure.

Finally, Patent ES 2.023.601 is known, which describes a method for obtaining an elastic net for carrying loads, as well as the net obtained therewith.

Moreover, this section must also consider the application field of the material that is the object of the invention, the use of which can be limited, on the one hand, to packaging food products in general and fruit and vegetables in particular and, on the other hand, to containing loads stored on pallets.

With respect to the case of the first application, it is worth highlighting, owing to their extensive use and good functional suitability, the packagings made of reticular net and auxiliary printed elements such as bands of printed film, paper labels, plastic labels, etc.

In those packagings that include net and plastic bands, the net may be of the woven, oriented extruded, or non-oriented extruded type. Each of these types of net has, for its main function as the element for containing the product inside the packaging, certain advantages and disadvantages, namely:

Woven net has a good strength-weight ratio, which makes it possible to optimise the cost of the packaging. It also has the advantage that, because of its light weight and volume, the spools can handle considerable meters of material at one time, which increases the work autonomy of automatic packaging machines. The disadvantage of woven net is that it has very low dimensional stability, and so the packagings formed using this type of net are easily deformed, which has a negative effect on the vertical structure and the ability to display the message or design printed on the packaging.

The packagings obtained with oriented extruded nets have the same advantages and disadvantages as those made from woven net, with the added fact that, generally, oriented extruded nets offer a low product coverage factor because the oriented threads have a small section.

From non-oriented extruded nets, packagings that maintain their vertical structure and provide a clear view of the design printed on the film bands are obtained. Nevertheless, these nets have a non-too favourable strength-weight ratio, and so heavyweight net has to be used, which negatively affects the cost of the packaging. On the other hand, since its threads are not oriented and they have a substantial section, these nets have a high product coverage factor, but at the same time, the spools can only handle a few meters at a time, which causes frequent stoppages in the automatic packaging machines to replace the empty spools.

With respect to the second case of application, reticular structures or flat nets are used when it is essential that air circulates inside the palletised load, so as not to produce water vapour, as is the case of pallets containing boxes of fruit, vegetables or fresh vegetables; or when hot elements are arranged which are to cool in the atmosphere, such as bricks and ceramic pieces just after they have been fired.

These contention elements can be perforated films, woven nets or extruded bi-oriented nets.

Perforated films have good elasticity and they are not very thick, and so a high number of meters can be provided on one spool, and they do not produce loose threads or a large amount of waste when the pallets are undone. As for the disadvantages, it is worth mentioning that they have limited tensile strength and that, since to maintain their cohesion the perforated surface cannot be very high, the ventilation effect inside the palletised load is very much reduced.

Extruded nets offer good tensile strength, but they suffer from the drawback that, owing to their thickness and rigidity, only a few meters fit on the spool and that the net takes up considerable space when the pallets are undone, and it has to be placed in waste containers.

Woven nets do not offer as good a shearing strength as the extruded oriented ones, particularly when the palletised load has ends with edges, but their main drawback is that when the net is cut to undo the pallets, threads come off that accumulate in the wheels and axes of the back pallet parts and stacking trucks, and that can cause breakdowns or, it at least means that the cleaning and maintenance frequency of these machines has to be increased.

BRIEF SUMMARY OF THE INVENTION

In view of the cited background, the detailed drawbacks of the tubular nets used to date and the characteristics required for a net made of synthetic plastics material of the type obtained from extrusion, depending on the application of the bag, the solution has been adopted whereby the net has the highest tensile strength possible, great coverage ability, a rib quality or slight rigid structure so that, once full, it maintains its dimensional shape at rest, avoiding the typical flaccidity of conventional bags, while also being very lightweight.

In order to achieve the foregoing ideal conditions for the plastic net to be used in the applications mentioned above, the solution has been adopted whereby maximum tensile strength is conferred to a synthetic plastic net obtained through extrusion while also reducing, as much as possible, the thickness of said net.

According to the preceding solution, the method of this invention has been developed, wherein a synthetic plastic material with a reticular tubular structure is obtained continuously through extrusion, is subjected through hot drawing to a two-dimensional molecular orientation operation in the longitudinal and transverse directions, is flattened, and is then subjected to a calender operation to even out the thickness of the flattened synthetic plastics material with a reticular oriented structure.

A characteristic of the method of the invention is that the tubular shaped synthetic plastics material with a reticular tubular structure is arranged like a rope in the operation of molecular orientation of said material by drawing it in the longitudinal and transverse directions, and afterwards, the material is arranged in a tubular flattened shape to be laminated by a calendering machine.

Another characteristic of the method of the invention is constituted by the fact that a synthetic plastics material with a reticular, tubular structure and obtained through extrusion, is hot subjected to a molecular orientation operation through longitudinal drawing, and to a transversal drawing operation by widening to give it the shape of a reticular tubular flattened structure, which is subjected to an operation to equal the thicknesses of the synthetic plastics material, while the widened condition of said reticular tubular structure is maintained, by laminating it and making it pass through a calendering machine, to convert the reticular tubular flattened structure into a new reticular tubular flattened and laminated structure.

Another characteristic of the invention lies in the fact that the reticular tubular flattened structure can be cut on its two edges after the longitudinal drawing operation and the transversal drawing by widening operation, to convert it into two independent reticular laminar structures, each laminated separately to form a reticular laminated structure.

Another characteristic of the invention, along the same lines as above, is the fact that the reticular tubular flattened structure can be cut along an eccentric longitudinal line, after the longitudinal drawing operation and the transverse drawing by widening operation, to convert it into a reticular laminar structure double the width of the reticular tubular flattened structure at the beginning, which is laminated across its full width.

The invention comprises a plant for developing the preceding method which, essentially, comprises an extrusion die for extruding a tubular net structure made from synthetic thermoplastic material followed sequentially by a two-dimensional hot drawing of said rope-like reticular tubular structure using a longitudinal drawing device and a transversal widening device for the same reticular tubular flattened structure, now with a tubular flattened shape, followed finally by a laminating device consisting of a calendering machine that shapes the said reticular tubular flattened structure into a new reticular tubular flattened and laminated structure.

Another characteristic of the plant of the invention is the fact that the laminating device consists of a calendering machine with two cylinders, with an adjustable reach and thermally conditioned, which at the entrance has a widening device for widening the reticular structure with a tubular flattened shape.

Another characteristic of the plant of the invention is that the widening device for widening the reticular tubular flattened structure consists of a triangular curvilinear plate that is mounted in a floating manner inside the tubular reticular structure and does not reach the motorised calendering rollers, and therefore it is retained within said structure thanks to two idle rollers mounted on said triangular curvilinear plate that roll on two idle rollers which, in turn, roll on said tubular reticular structure which moves forward towards the motorised rollers of calendering machine.

Another characteristic of the plant of the invention lies in the fact that a longitudinal cutting device is arranged on each of the two edges of the reticular tubular flattened structure, which are located between the idle rollers and two pre-laminating rollers upstream from the rollers of calendering machine.

Another characteristic of the plant of the invention is the fact that in one case a single eccentric longitudinal cutting device for cutting the reticular tubular flattened structure is provided, said cutting device being complemented with an opening/turning device located between the pre-laminating rollers and the calendering rollers.

The invention comprises the reticular structure material resulting from the preceding method, which has the characteristic of consisting of a synthetic plastic shaped according to a reticular filiform structure wherein, having a tubular flattened shape, the filaments making up the sides of the net mesh of said structure and the crossover points of said filaments for shaping the net, have the same common thickness.

Another characteristic of the material of the invention lies in the fact that the thickness of the crossover points of the net filaments is equal to the thickness of the filaments making up the sides of the net that are not affected by the laminating action through a calender and, in some cases, the thickness of the crossover points on the net and the thickness of the sides thereof is smaller than the thickness of the sides of the net before being affected by the laminating process through a calender.

Finally a characteristic of the invention is also the fact that the reticular structure of the net is monolith and obtained through extruding a synthetic plastics material susceptible to having the characteristics of an elastomer.

BRIEF DESCRIPTION OF THE DRAWINGS

In order to facilitate the understanding of the foregoing ideas, a method is described below for shaping a reticular material, a plant for performing said method and a material resulting from said method, all according to the invention and with reference to the illustrative accompanying drawings, in which:

FIG. 1 is a schematic supposed elevation view of the development of the stages for shaping a reticular material, performed according to the method of the invention.

FIG. 2 is a schematic supposed plane view of the development of the stages for shaping a reticular material, performed according to the method of the invention.

FIG. 19 is a schematic, centred longitudinal sectional elevation view, showing the device for widening or pressing a tubular flattened net, and the sectioning of the edges thereof and their separation into two reticular laminar structures that are fed separately into respective laminating calendering machines.

FIG. 21 is a comparative graph of the strength and elongation of two tubular nets, one standard type and the other one laminated according to the invention.

FIG. 22 is a comparative graph of the strength per unit weight of two tubular nets, one standard type and the other one laminated according to the invention.

DETAILED DESCRIPTION OF THE DRAWINGS

Figure 3:
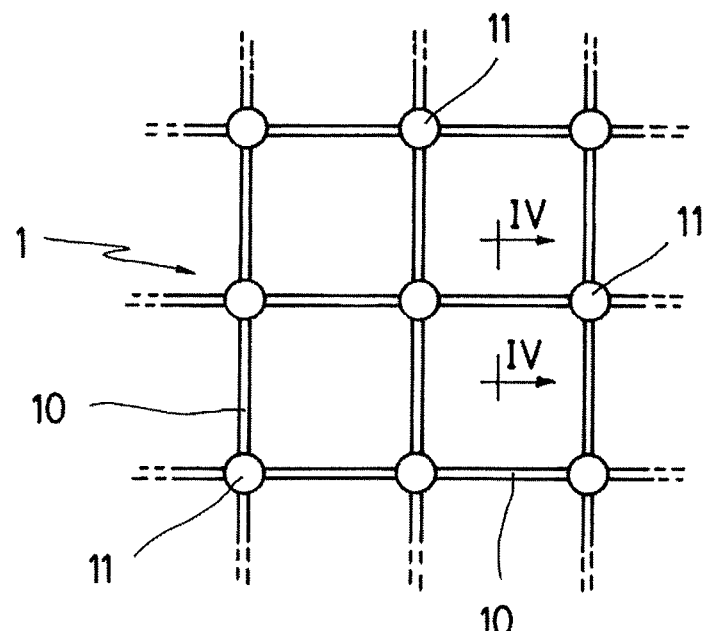
FIG. 3 is a plane, geometrically schematic view of a fragment of material with an ideal reticular structure wherein the sides of the meshes are regularly rectilinear and their crossover points are represented by flared projections.

The method that is the object of this invention, which consists essentially in a synthetic plastics material with a reticular tubular structure being hot subjected to a two-dimensional molecular orientation operation, in the longitudinal and transverse directions, through drawing, followed by an operation to equal the thicknesses of the synthetic plastics material through laminating it in a calender, is shown graphically in the diagrams in FIGS. 1 and 2.

FIG. 1 shows what is supposedly a side elevation view, of the development of the stages for shaping a thermoplastic material with a reticular tubular structure 1, obtained in this tubular shape from an extrusion die 2, from which extrusion die 2 it is gathered in the form of a rope 3 between two rotary entry rollers 4 that deliver it to two other rotary drawing rollers 5 that have a greater angular speed that the former ones, whereby longitudinal drawing occurs that determines the molecular orientation of the material with a reticular tubular structure 1, which determines the increased tensile strength thereof.

Then, when exiting the rotary drawing rollers 5 the rope-like 3 material with a reticular tubular structure 1 is introduced into a widening device 6 wherein said rope 3 opens and is arranged as a reticular flattened tubular structure 7 and it is immediately fed in between two rotary pressing rollers 8 which laminate the material with a reticular tubular structure 1 between them, in order to convert it into a material with a reticular tubular laminated structure 9 having a reduced, constant thickness, which has also undergone a molecular orientation in the transverse direction.

FIG. 2 shows a top view of the development of the stages for shaping the thermoplastic material with a reticular, tubular structure 1, showing the same components as the previous figure, indicating the function thereof which is not evident in said previous figure.

Figure 4:
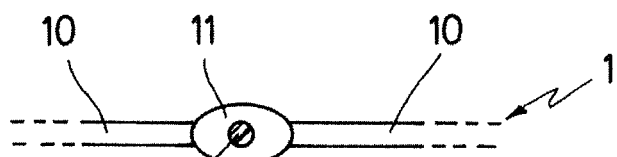
FIG. 4 is a section along line IV-IV in FIG. 3.

FIG. 3 shows in a geometrically schematic view, a fragment of a material with a reticular structure 1 which, it is established, has not been laminated, wherein the mesh, which is squared, is made up of regularly rectilinear sides 10 that cross over regularly forming crossover points 11 that are thicker than sides 10 and are shown as noticeably lenticular flared projections. FIG. 4 shows a side view of said flared projections according to a section along line IV-IV in FIG. 3.

Figure 6:
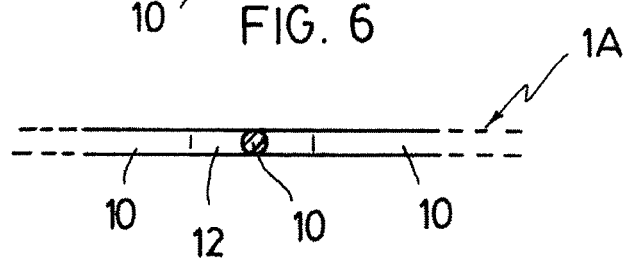
FIG. 6 is a section along line VI-VI in FIG. 5.
Figure 5:
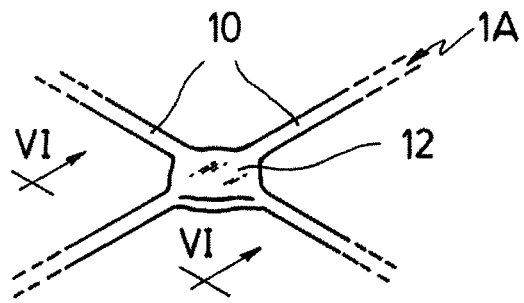
FIG. 5 is a geometrically schematic perspective view of a cross on the sides of four meshes in FIG. 3, once the material with a reticular structure has been laminated according to the thickness of the sides thereof.

FIG. 5 is a schematic perspective view of the material with a reticular structure 1A in FIG. 3 once it has undergone a laminating operation by calendering to flatten the flared projections of crossover points 11, reducing them to disc-shaped crossover points 12 having a thickness equal to the diameter of sides 10 of the squared mesh. FIG. 6 shows a side view of said disc-shape crossover points 12 according to a section along line VI-VI in FIG. 5.

Figure 7:
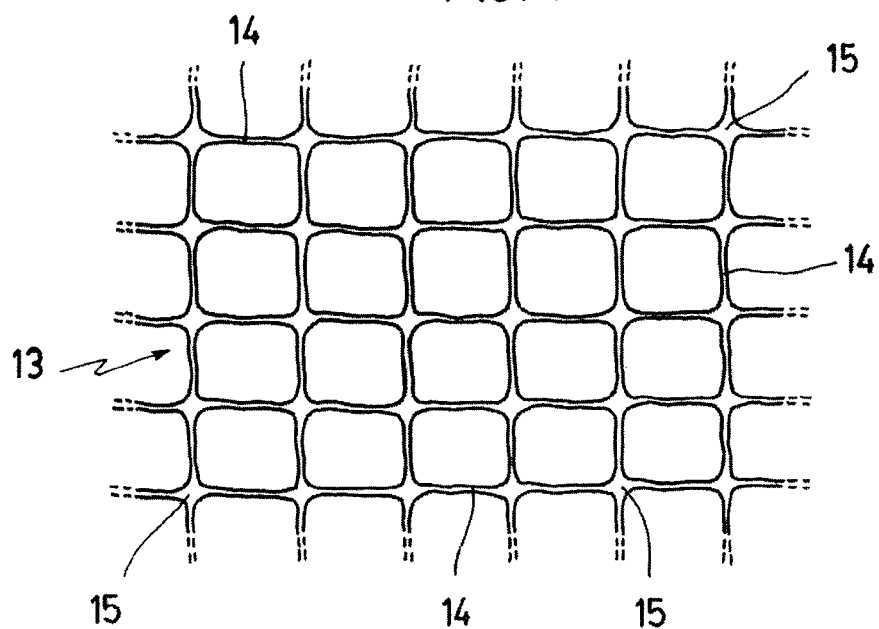
FIG. 7 is a plane view of a fragment of a conventional extruded net with squared mesh, which can only have one molecular orientation.
Figure 8:
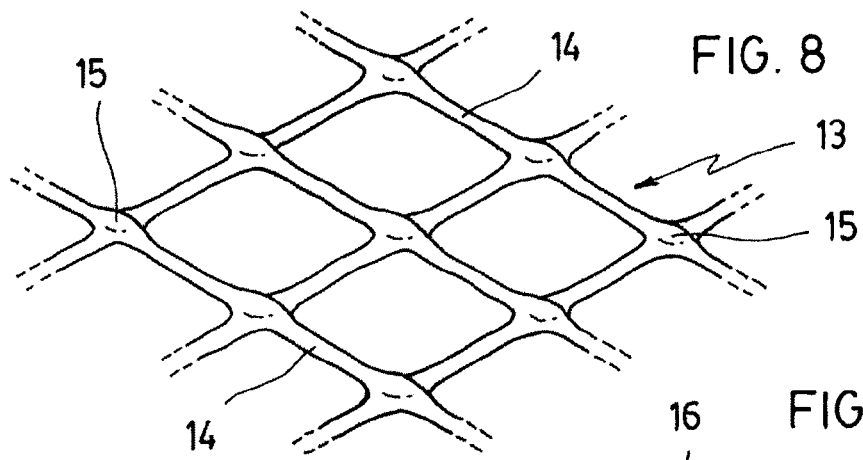
FIG. 8 is a perspective view of a part of the fragment of the net with squared mesh in the preceding figure, showing in relief the crossover points of the sides of the mesh.
Figure 9:
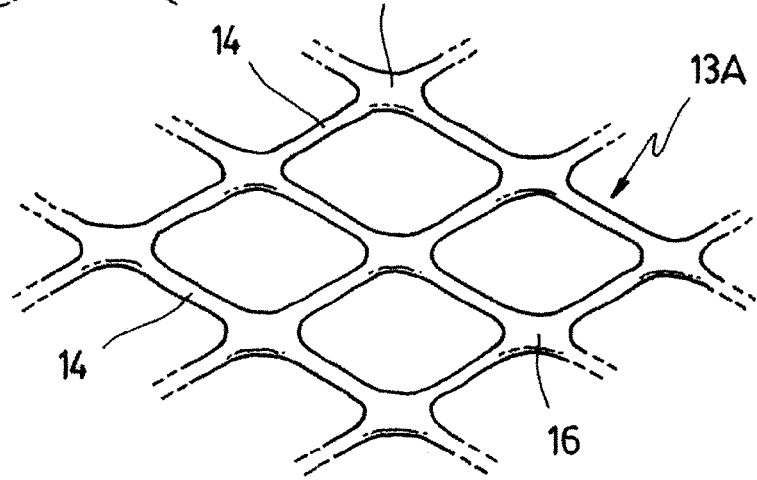
FIG. 9 is a perspective view of the part of the net with squared mesh in the preceding figure, once the mesh crossover points have undergone a laminating operation.

FIG. 7 shows a fragment of a material with a reticular structure and a real shape and which is defined as a conventional extruded net 13 with squared mesh which has an assumed two-dimensional molecular orientation, and has mesh formed by the orthogonal intersection of filaments that form the sides 14 thereof and establish relevant crossover points 15, which are relevant with respect to said filaments owing to the increased thickness resulting from the sum of the thicknesses thereof in the crossover points of said filaments of sides 14 of the mesh, with the relief thereof being visible in the perspective view of part of said extruded net 13, forming FIG. 8. FIG. 9 shows the part of extruded net 13A in FIG. 8, once it has undergone a laminating operation, wherein it is observed that the thickness of the relevant crossover points 15 in the mesh, indicated in said FIG. 8, has reduced with respect to the thickness of sides 14 of the mesh thereof, creating flat crossover points 16.

Figure 10:
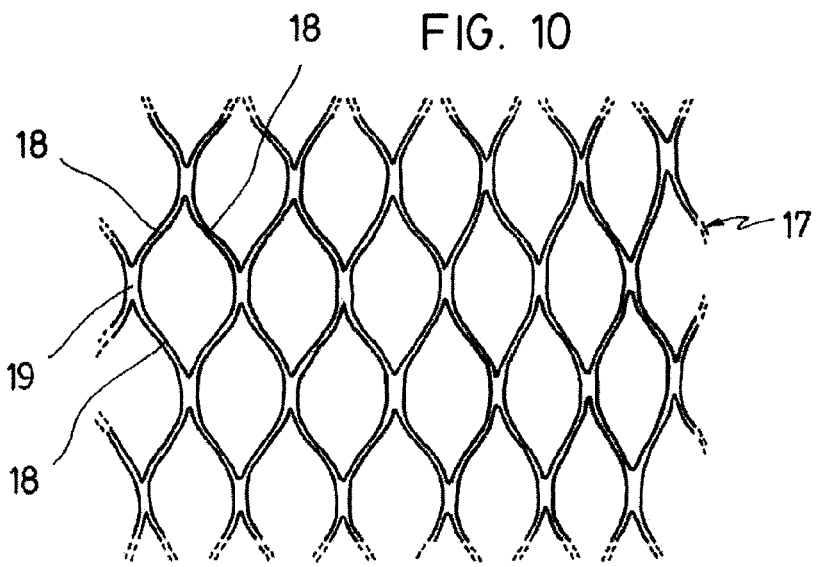
FIG. 10, similar to FIG. 7, is a plane view of a fragment of an extruded net with rhomboid shape mesh, which can only have one molecular orientation.
Figure 11:
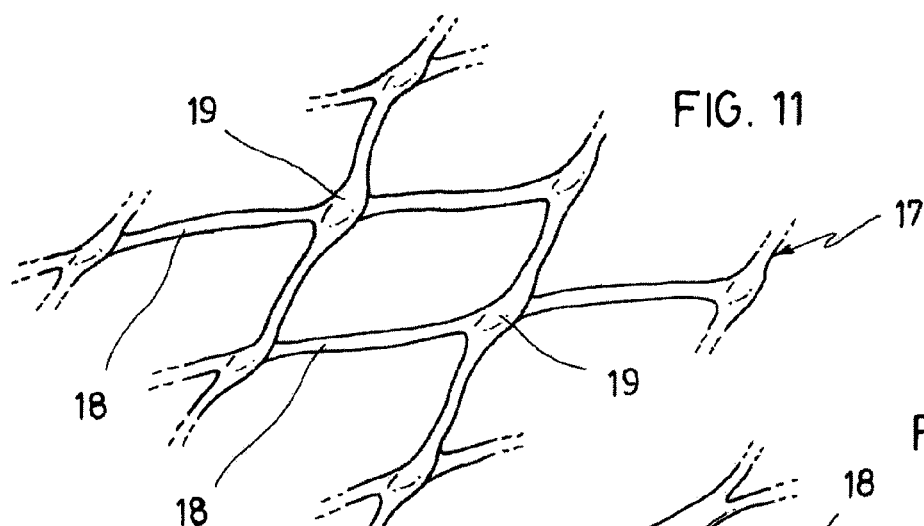
FIG. 11 is a perspective view of a part of the fragment of net with rhomboid shaped mesh in the preceding figure, showing in relief the crossover points of the sides of the mesh.
Figure 12:
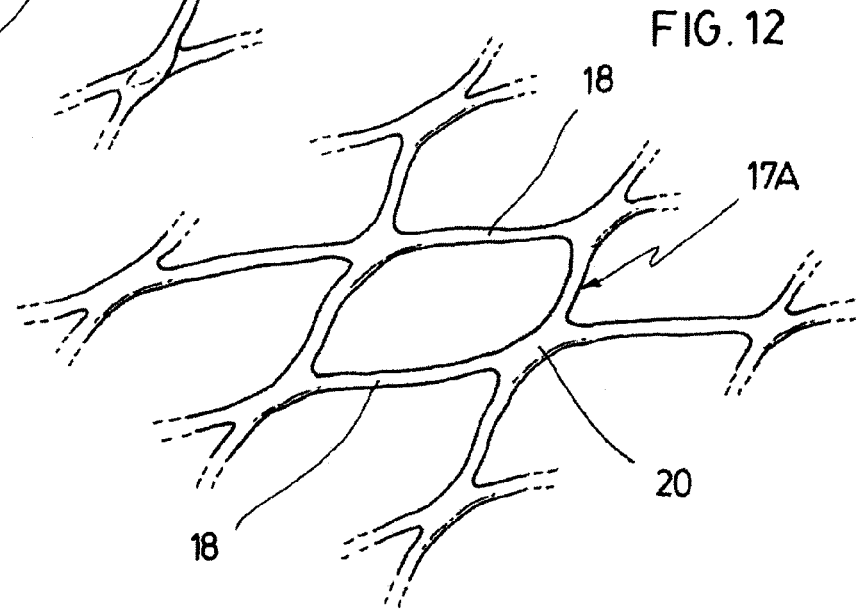
FIG. 12, similar to FIG. 9, is a perspective view of the part of the net in the preceding figure once the crossover points have undergone a laminating operation.

FIG. 10, similar to FIG. 7, shows a fragment of a material with a reticular structure and real shape and which is defined as a conventional extruded net 17 with rhomboid mesh, which has an assumed two-dimensional molecular orientation, and has rhomboid mesh formed by the intersection of filaments forming sides 18 thereof and that establish relevant crossover points 19, designated as such for the same reasons as those given above in FIG. 8, with the relief thereof being visible in the perspective view of part of said extruded net 17, forming FIG. 11. FIG. 12 shows the portion of extruded net 17A in FIG. 10, once it has undergone a laminating operation, wherein it is observed that the thickness of the relevant crossover points 19 of the mesh, indicated in said FIG. 11, has been reduced with respect to the thickness of sides 18 of the mesh thereof, creating flat crossover points 20.

Figure 13:
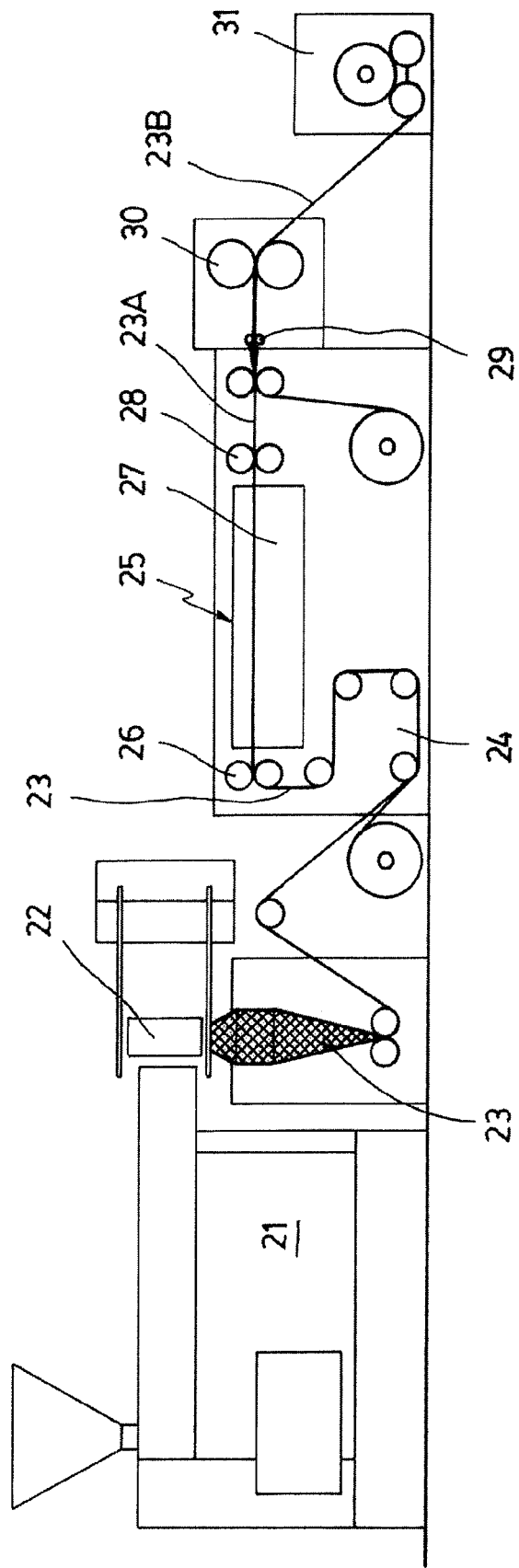
FIG. 13 is a schematic view of a tubular net extrusion plant to which there is connected a plant for drying the extruded net and performing a longitudinal molecular orientation, followed by a laminating calender for laminating the net arranged transversally and a winding apparatus for the laminated net.

FIG. 13 shows a plant for developing the method of the invention which in practice is disregarded, which comprises, essentially, an extrusion machine 21 which, using a rotary die 22, produces a material with a reticular structure in the shape of a conventional type extruded tubular net 23, which extruded tubular net 23 is cooled in a vat containing water and led to a plant 24 that shakes it and from which it passes to a molecular orientation plant 25, comprising a pair of motorised entry rollers 26, a heated air tunnel 27 and a pair of motorised exit rollers 28 that rotate faster than the previous pair, from which the extruded tubular oriented net 23A is forwarded to a widening device 29 and to a laminating head made up of a pair of motorised calender rollers 30, at the exit of which the extruded, flattened, oriented and laminated net 23B is gathered on a winding apparatus 31.

Figure 14:
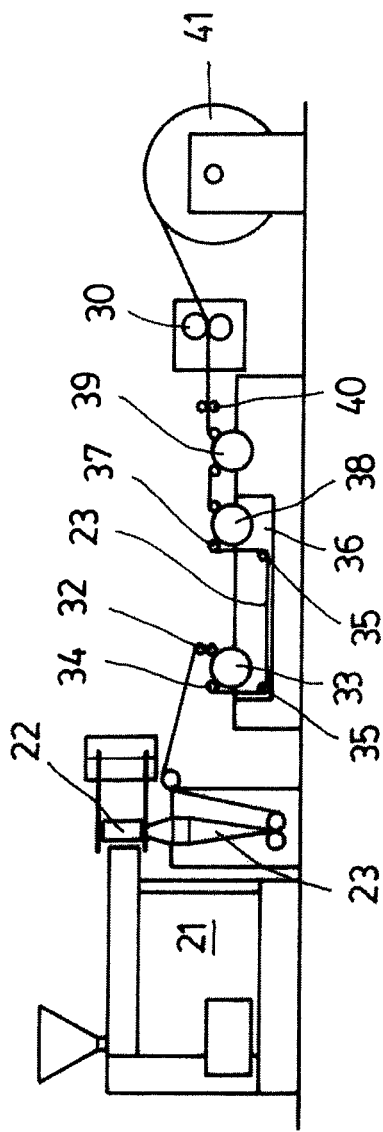
FIG. 14 is a schematic view of a plant intended for obtaining an extruded tubular net followed by longitudinal drawing for its molecular orientation and by laminating in a calender which ends in winding up the net.

FIG. 14 corresponds to another possible plant for performing the method of the invention, which, as above, is disregarded in practice, and which like the plant described in FIG. 13, comprises extruding machine 21 and rotary die 22 from which there emerges the material with a reticular structure in the shape of a conventional type tubular extruded net 23, which is led to a longitudinal drawing device that is made up of a pair of traction rollers 32 for said tubular extruded rope-like net 23, where with said rollers lying on a retention drum 33, the lower roller applies said rope against a large part of the periphery of said retention drum 33 from which it is separated by a guiding roller 34 which leads it in the vertical direction towards a driver roller 35, immersed in the bath in a vat 36, through which there circulates the tubular structured net 23 until it reaches another driver roller 35 that sends it to a guiding roller 37 that is applied to a drawing drum 38 from which it passes to a driver drum 39 and, then, to a pair of traction rollers 40, which deliver the oriented material to motorised rollers 30 in a calendering machine, which material is then gathered onto a winding apparatus 41.

Figure 15:
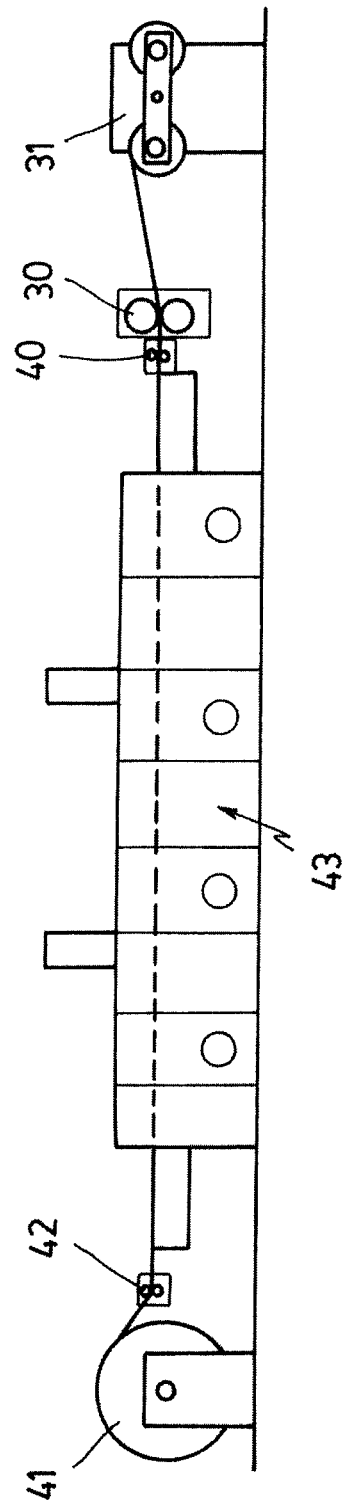
FIG. 15 is a schematic view of a plant intended for the transverse orientation of an extruded tubular net, which can be oriented, or not, in the longitudinal direction.

FIG. 15 corresponds to a plant designed for the transverse orientation of the material with a reticular structure, which is preferably applied to transversal widening of laminar material, without excluding the possibility of being applied, with lower effectiveness, to a tubular material. The plant consists of a conventional machine in the textile industry for treating fabrics widthways, which are known by the name of tenters 43 and which comprises a tunnel provided with heating means through which there extend two chains that have needles that move parallel to one another.

Figure 17:
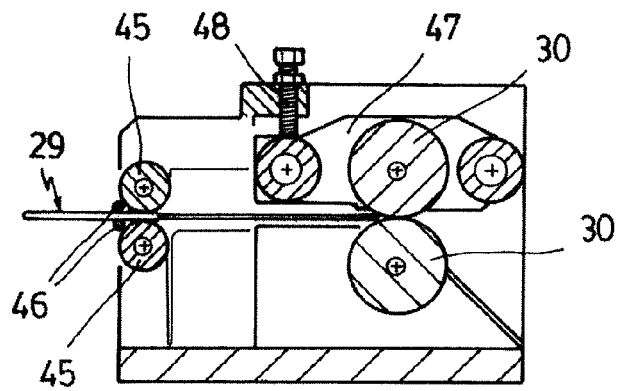
FIG. 17 is a schematic, sectional view along line XVII-XVII of FIG. 16, in a side elevation view, distinguishing the device for widening or pressing the flattened tubular net, located at the entrance to the laminating calender.
Figure 18:
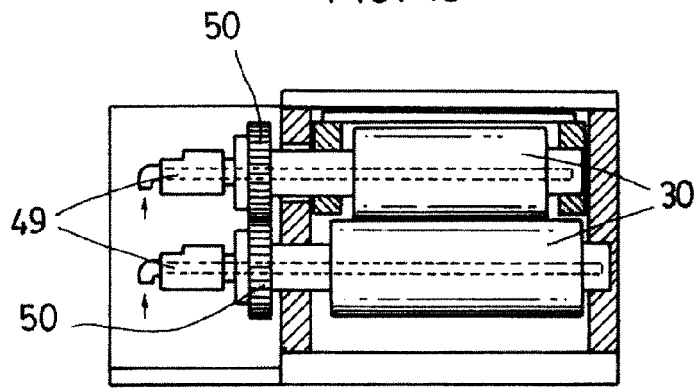
FIG. 18 is a schematic view of a section along line XVIII-XVIII in FIG. 16.
Figure 16:
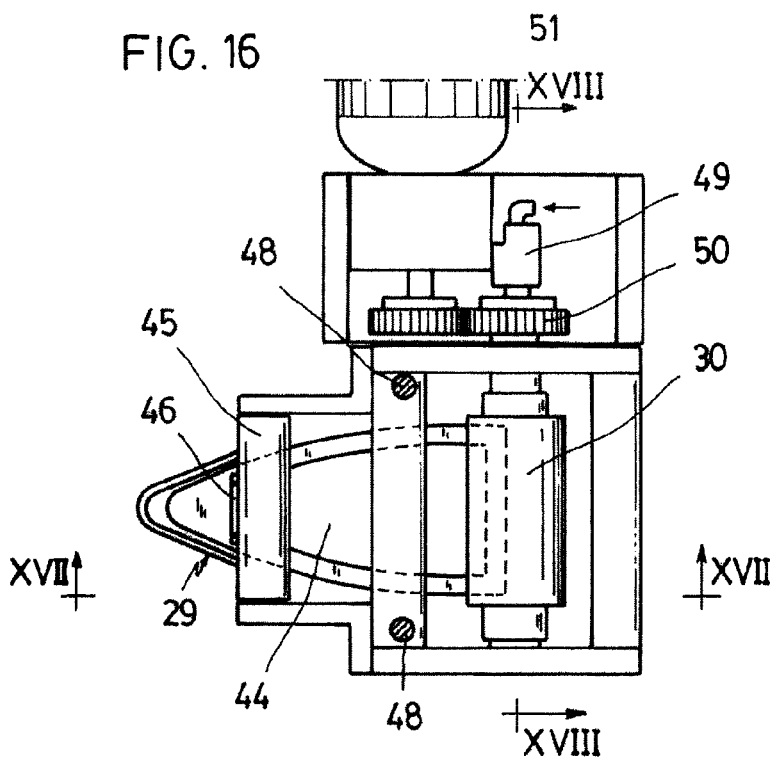
FIG. 16 is a schematic view, according to an upper view, of a calendering head for widening the flattened tubular net and immediately laminating it.

FIGS. 16, 17 and 18 show a schematic view of an embodiment of the means for widening and laminating the material with a reticular tubular structure, that comprises a widening device 29 made up of a triangular curvilinear plate 44 that is assembled in a floating state, but retained, inside the tubular reticular structure 23A (see FIG. 13) and between two idle rollers 45 that rotate on said tubular reticular structure 23A allowing it to advance towards motorised rollers 30 of the calendering machine, while retaining said widening device 29 thanks to two rollers 46 thereof that prevent the triangular curvilinear plate 44 from passing between idle rollers 45.

The top motorised roller 30 is mounted in a pivoting frame 47 which, by means of micrometric screws allows the reach between the two motorised rollers to be varied in order to adjust the pitch between them to the thickness desired for laminating the material with a reticular structure 23A.

Both motorised rollers 30 are provided with thermal adaptation means 48, gears 50 and driving motor 49.

FIG. 19 shows an embodiment of the invention according to which the widening device 29 or pressing device, which is housed inside a tubular flattened net 7, allows the edges of said net to be sectioned by a cutting device 51 and separated into two reticular laminated structures 7A and 7B which are fed together between a pair of pre-laminating rollers 52 and, immediately, they are fed separately into respective laminating calendering machines 30A from which there emerge two reticular laminated structures 9A and 9B.

Figure 20:
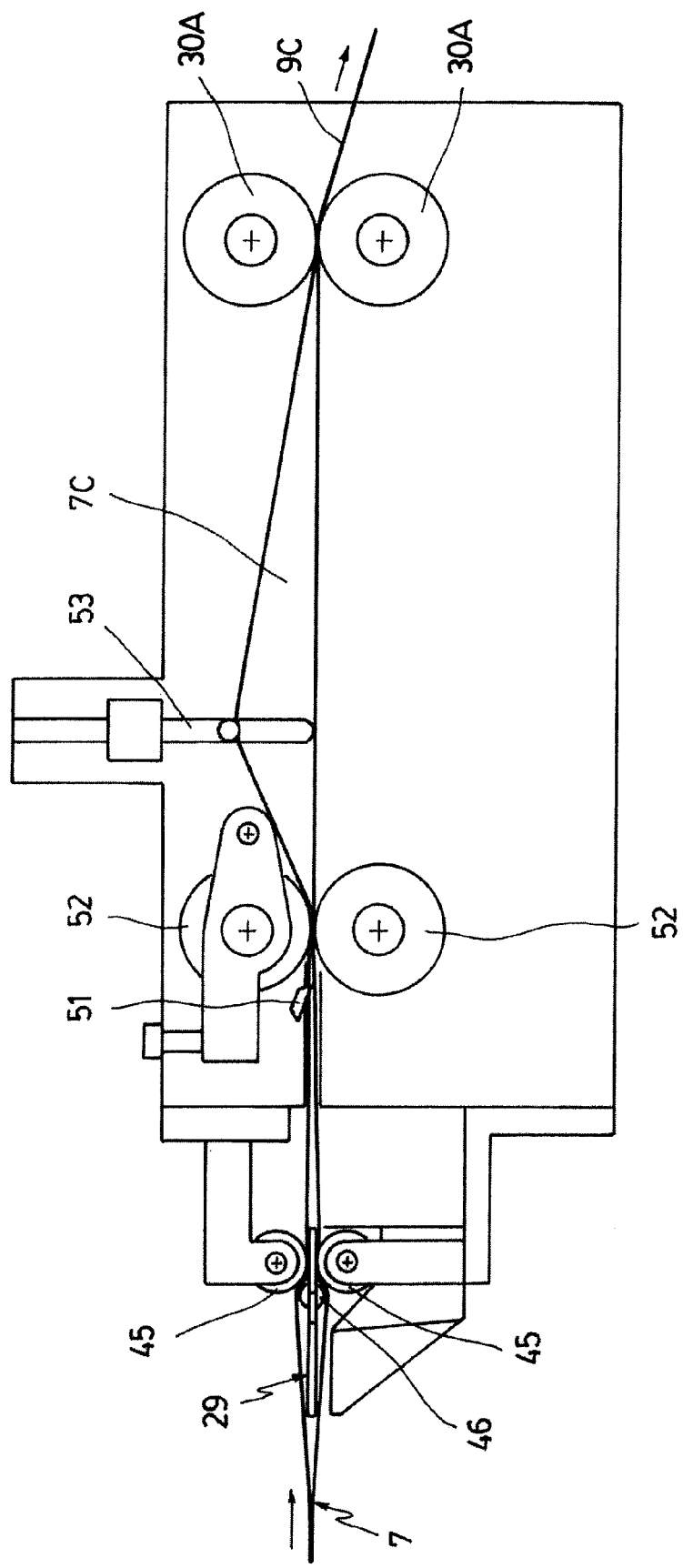
FIG. 20 is a schematic, centred longitudinal sectional elevation view, showing the device for widening or pressing a tubular flattened net, and the sectioning of one of the two edges thereof and its opening into a reticular laminar structure double the width of the tubular flattened net at the beginning, which is fed into a laminating calendering machine.

FIG. 20 shows another embodiment of the invention according to which the widening device 29 or pressing device, which is housed inside a tubular flattened net 7, allows one of the two edges of said net to be sectioned by a cutting device 51, before it passes between two pre-laminating rollers 52, and to be extended in the transverse direction by an opening/turning device 53 to adopt the shape of a reticular laminar structure 7C double the width of the tubular flattened structure 7 at the beginning, which is fed into a laminating calendering machine 30A from which there emerges a reticular laminated structure 9C.

As an example of the behaviour of a standard material with a reticular tubular structure and non-oriented rhomboid mesh, and a laminated material with a reticular tubular structure and oriented rhomboid mesh, both materials consisting of a two-thread mesh, the weight of the first one material, per square meter, is 54 g, and the weight of the second one, per square meter, is 37 g, with the characteristics of absolute resistance according to the elongation being those indicated in FIG. 21, whereas their resistance per weight unit is indicated in FIG. 22. In both cases, the graphs of said figures have been drawn up on the basis of tests conducted using the INSTRON 4301 testing apparatus, wherein the probes are 250 mm wide, the distance between the clamps is 50 mm, and the traction speed 500 mm/min.

In view of FIGS. 21 and 22 it is noted that the material with a reticular tubular structure that underwent the two-dimensional molecular orientation and laminating operations is more resistant than the standard material, even though it has a smaller weight, and it must take into account that the normal working conditions do no exceed elongation values over 5%, as otherwise the mesh would become deformed, all as detailed in the following table:

|  | 5% | 10% | 15% | 20% | 25% |
|---|---|---|---|---|---|
| Resistance (kp/probe) acc. elongation | | | | | |
| Standard mesh | 8.8 | 13.2 | 15 | 16.2 | 17.2 |
| Laminated mesh | 18.4 | 29.5 | 37 | 42.4 | 47 |
| Resistance (kp/weight unit) acc. elongation | | | | | |
| Standard mesh | 16.3 | 24.4 | 27.8 | 30.0 | 31.9 |
| Laminated mesh | 49.7 | 79.7 | 100.0 | 114.0 | 127.0 |

With the tubular laminated mesh described in this invention practical improvements are obtained that overcome the drawbacks detailed at the beginning of the description suffered by the other types of mesh and films, and with a reticular structure or mesh that is the object of this invention, it is possible to combine the advantages of the mesh described in the previous paragraphs, while also overcoming their drawbacks.

Since this mesh originates from a tubular extruded net, and it is oriented in the longitudinal and transverse directions (bi-oriented), it has a high degree of resistance for all kinds of loads. As the threads and knots are flattened, the mesh looses a fair part of its rigidity and so it occupies less space when it is removed and, moreover, owing to its fullness a large number of meters can be wound on an individual spool. Since it is not a woven mesh, there is no waste in the form of loose threads when said mesh is cut to dismantle the pallets and, consequently, the problem of dirt in the rear pallet parts and forklift trucks is avoided. Another important advantage is that, depending on the materials used and the drawing ratio applied, the mesh can have higher elasticity, which greatly facilitates its application.

The tubular, two-dimensionally oriented and laminated mesh that is described in the invention has a good resistance-weight ratio, as it originates from an extruded oriented mesh, whereby it is possible to obtain low cost packaging. It has good dimensional stability, and so the packaging obtained with this mesh maintains its vertical shape and offers a clear view of the message printed on the film band. Since the threads and knots, formed by the intersections between them, are flattened, this mesh provides a better product coverage factor and, for the same reason, a greater number of meters can be wound on the spools than with extruded, non-oriented mesh.

What is claimed is:

1. A material with a tubular reticular structure formed by filaments extending in two oppositely tilted directions with respect to an axial direction of the tubular reticular structure and crossing over one another at crossover points to form a net mesh as a tubular net of interconnected rhomboid meshes each having two opposite acute-angled vertices and two opposite obtuse-angled vertices, the material being shaped by a process comprising the steps of:
    continuously extruding a synthetic plastics material to obtain a tubular reticular structure in which the crossover points of the filaments are thicker than the actual sides of said net mesh;
    continuously subjecting the extruded tubular reticular structure to a two-dimensional molecular orientation operation in longitudinal and transverse directions, by arranging the extruded tubular reticular structure as a rope and hot-drawing the rope longitudinally to form an oriented tubular reticular structure;
    continuously subjecting the oriented tubular reticular structure arranged as a rope to a transversal drawing and flattening operation, using a widening device that gives the oriented tubular reticular structure a flattened configuration in which two parts of the oriented tubular reticular structure are placed one on top of the other to form a flattened oriented tubular reticular structure; and
    continuously subjecting the flattened oriented tubular reticular structure, while maintaining the widened and flattened condition thereof, to an operation to even out the thickness of the flattened oriented tubular reticular structure, by passing the flattened oriented tubular reticular structure through a calendering machine that transforms the flattened oriented tubular reticular structure into a laminated oriented tubular reticular structure in which the crossover points of the filaments forming the sides of the net mesh are made to have the same thickness as the actual sides of the net mesh.

2. The tubular reticular structure according to claim 1, wherein said crossover points and said sides of said rhomboid meshes have the same common thickness along the whole extent of said tubular reticular structure.

3. The tubular reticular structure according to claim 1, wherein the plastic material of the reticular tubular structure has the characteristics of an elastomer.

\* \* \* \* \*